May 24, 1966  J. H. HEIDORN  3,252,294
REFRIGERATING FLOW CONTROL MEANS
Filed Dec. 12, 1963
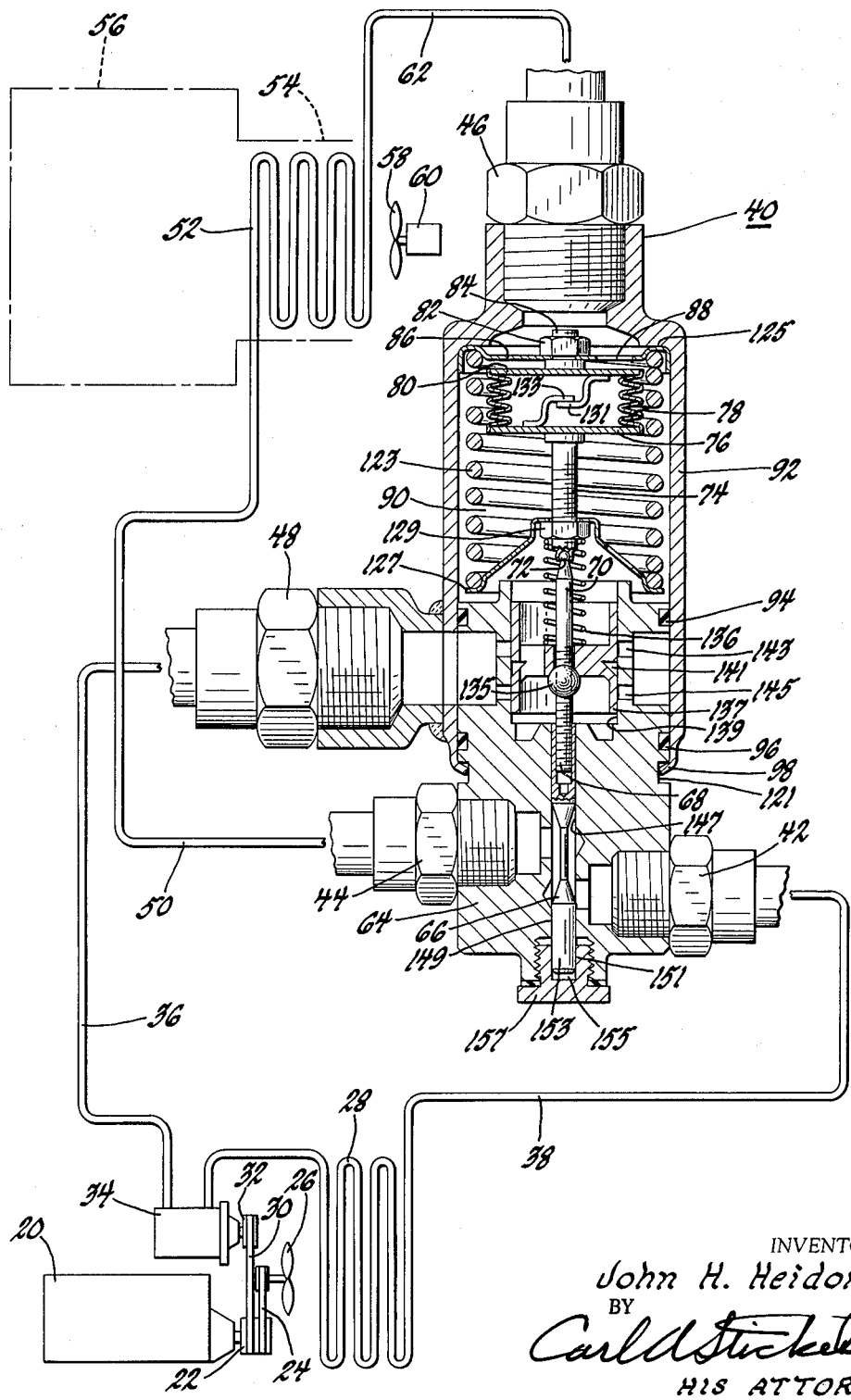
INVENTOR.
John H. Heidorn
BY
Carl A Stickel
HIS ATTORNEY

United States Patent Office 3,252,294
Patented May 24, 1966

3,252,294
REFRIGERATING FLOW CONTROL MEANS
John H. Heidorn, Dayton, Ohio, assignor to General Motors Corporation, Detroit, Mich., a corporation of Delaware
Filed Dec. 12, 1963, Ser. No. 330,076
8 Claims. (Cl. 62—207)

This invention pertains to refrigerating apparatus and more particularly to the control of refrigerant flow into and out of the evaporator.

The control of refrigerant flow into and out of the evaporator is a difficult problem as indicated by the thousands of inventions made and patents issued pertaining to this. One of the most difficult control problems is found in automotive air conditioning systems. Contrary to most refrigerating systems, the operation of the automotive compressor is not in accordance with refrigeration requirements since it is driven by the automobile engine which is operated in accordance with driving requirements. Inasmuch as the original purchaser and owner of air conditioned cars can be expected to keep the car for no more than several years, it is necessary that automobile air conditioning systems be manufactured and sold as inexpensively as possible. Since the space within the automobile is very limited, and yet a large capacity system is required because of the extensive areas of glass, and also because of the movement of the car through air, it is urgent that maximum capacity be obtained with small compact units including the evaporator. To obtain the maximum cooling from the evaporator, it is necessary to operate the evaporator as cold as possible over the entire surface thereof with the maximum supply of refrigerant that can be evaporated without the accumulation of frost thereon. It is known that it is possible to operate an evaporator at colder temperatures without frost accumulation when the outside air temperature is high and the refrigeration load is heavy. Conversely, frost will accumulate readily when the outside air temperature is low and the refrigeration load is light.

It is an object of this invention to provide a refrigerating system with a simplified dual control for controlling both the flow of refrigerant into and out of the evaporator which will operate the evaporator at as high an output as possible and at as low a temperature as possible throughout without the accumulation of frost thereon.

It is another object of this invention to provide a refrigerating system with a simple control in which the pressure maintained in the evaporator is reduced as the environment temperature increases.

It is another object of this invention to provide a refrigerating system with a simple control in which the pressure maintained in the evaporator is reduced as the condenser pressure increases.

It is another object of this invention to provide a refrigerating system with a simple control of refrigerant flow in major proportion responsive to the pressure in the evaporator and in minor proportion responsive to the pressure or temperature of the condenser.

These and other objects are attained in the form shown in the drawing in which a diagrammatic automobile air conditioning system is provided with a dual valve having two sets of inlets and outlets, one for the evaporator inlet, and the other for the evaporator outlet. An evacuated bellows is directly connected to a sleeve valve controlling the flow out of the evaporator and is also directly connected to a liquid valve for controlling the flow of liquid into the evaporator. The refrigerant under condenser pressure has access to one end of the liquid valve which as the condenser pressure increases will tend to open the sleeve valve wider so as to reduce the pressure maintained within the evaporator. This causes the evaporator to be operated at a slightly colder temperature when the outside temperature is high so that it may carry a greater refrigeration load without the accumulation of frost.

Further objects and advantages of the present invention will be apparent from the following description, reference being had to the accompanying drawings wherein a perferred embodiment of the present invention is clearly shown.

In the drawings:

The Figure is a diagrammatic representative of an automobile air conditioning system provided with a dual valve in section embodying one form of my invention.

Referring now to the drawing, there is shown diagrammatically an automatic engine 20 normally used for driving the automobile having a dual pulley 22 at the front end of the crank shaft which through a belt 24 drives the radiator fan 26 which also circulates air in heat transfer relation with the condenser 28. The condenser 28 is normally located in front of the automobile radiator. However, if the engine 20 is air cooled, the condenser 28 may be located in the incoming air stream of the fan 26. The pulley 22 through a second belt 30 drives a pulley 32 on the front end of the refrigerant compressor 34. The pulley 32 may have incorporated therein an electromagnetic clutch for the purpose of declutching the compressor 34 whenever refrigeration is not required. The compressor 34 withdraws evaporated refrigerant from the suction conduit 36 through its inlet and compresses the refrigerant and discharges the compressed refrigerant through its outlet which is connected to the inlet of the condenser 28. The outlet of the condenser 28 is connected through the conduit 38 with the dual valve 40 embodying my invention.

This valve 40 has a liquid inlet 42, a liquid outlet 44, and at the top a gas inlet 46 and at the side a gas outlet 48. The liquid outlet 44 is connected through the conduit 50 with the inlet of the air conditioning evaporator 52. This evaporator 52 may be located as indicated diagrammatically in a duct 54 connecting with the passenger compartment 56 of an automobile. A fan 58 driven by an electric motor 60 draws outside air or a mixture of outside air and recirculated air and forces this air through the duct 54 in heat transfer relation with the evaporator 52 for discharge into the passenger compartment 56. This will keep the passenger compartment cool and comfortable. The air may, after cooling the car, escape through a partially open window. The outlet of the evaporator 52 is connected by the conduit 62 with the gas inlet of the dual valve 40.

The dual valve 40 includes a lower valve body 64 containing the liquid inlet and outlet 42 and 44 and a liquid valve 66. This liquid valve 66 is connected by a threaded connection 68 to the valve stem 70 connected by a ball and socket connection 72 with the threaded rod 74 having its upper end bonded to the lower plate 76 of a metal bellows 78. The upper end of the metal bellows 78 is closed by an upper plate 80 which is bolted by the nut 82 and the bolt 84 to a disc 86. The disc 86 has an opening 88 permitting the flow of evaporated refrigerant from the inlet 46 to the spring chamber 90 enclosed by the upper valve body 92. The upper valve body 92 is telescoped over the lower valve body 64 which has grooves containing the seal rings 94 and 96 making sealing engagement with the internal cylindrical surface of the upper valve body 92. The upper valve body 92 is connected to the lower valve body 64 by spinning inward its lower edge 98 into the groove 121 in the lower valve body 64.

The spring chamber 90 contains a compression-type coil spring 123 having its upper end pressing against the flange of the disc 86 which is press fitted into the upper valve body 92 against the inner shoulder 125 at the top of the cylindrical wall of the upper valve body 92. The bottom of the spring 123 is supported on the nut 129 which is threaded onto the rod or bolt 74. The nut 129 may be adjusted to control the tension of the spring 123 which determines the expansion and contraction of the metal bellows 78. Preferably the metal bellows 78 is evacuated to as low an absolute pressure as possible. The bellows 78 is limited in its expansion by the inter-engaging brackets 131 and 133 within the bellows 78 to prevent damage from over expansion of the bellows under any conditions. Particularly these internal brackets 131 and 133 form an internal stop to prevent the spring 123 from exerting sufficient force on the bellows 78 to cause the bellows 78 to become damaged.

The valve stem 70 is provided with an adjustable ball 135 cooperating with a spherical socket on the web of the sleeve valve 137 which is slidably mounted in the cylindrical bore 139 in the upper ported cylinder portion of the valve body 64. The ball 135 is held in its socket on the sleeve valve 137 by a small spring 136. The sleeve valve 137 is provided with an annular slot 141 adapted to register with the slots 143 in the cylindrical wall 139 to permit the flow of gas from the inlet 46 through the spring chamber 90 to the outlet 48. The bottom of the sleeve valve 137 is also adapted to rise sufficiently to uncover the the lower slots 145 to permit the flow of gas through an aperture in the web of the sleeve valve 137 to the outlet 48.

The liquid valve 66 cooperates with the small diameter cylindrical bore 147 to limit the flow of liquid refrigerant into the inlet of the evaporator 52 so as to maintain at all times a restricted flow into the evaporator 52. This flow is controlled in accordance with the contraction of the bellows 78 in accordance with the pressure prevailing within the evaporator 52. Therefore when the pressure of the evaporated refrigerant within the evaporator 52 is high, the bellows 78 will be collapsed and the valve 66 will be drawn upwardly to reduce the liquid flow into the evaporator 52. Simultaneously with this movement of the liquid valve 66 there is an upward movement of the sleeve valve 137 which after a minimum pressure in the evaporator 52 of about 27½ lbs. will gradually open to allow an increasing gas flow out of the evaporator 52 as the pressure therein rises. The dual valve as thus far described is adapted to maintain a substantially constant evaporator pressure within the evaporator 52 corresponding to the lowest temperature which can be maintained without the accumulation of frost on the evaporator. This will prevent the accumulation of frost on the evaporator even under light refrigeration loads and low outside temperatures.

To further improve the control of this system, and particularly to allow an increase in cooling capacity when the outside temperature is high, and particularly when the temperature of and the pressure in the condenser 28 is high due to the high outside temperature, the pressure of the liquid refrigerant entering the lower valve body 64 through the inlet 42 is permitted to flow or leak through the extensions 149 and 151 of the cylindrical bore 147 surrounding the lower cylindrical guide portion 153 of the valve 66 into the chamber 155 beneath the cylindrical portion 153 in the removable cap 157. This leakage of the liquid refrigerant at the pressure within the condenser 28 into the chamber 155 produces an upward force upon the bottom of the cylindrical member 152 which is proportional to the pressure within and the temperature of the condenser 28 and thus to the temperature of the outside air. This upward force will cause the valve 66 to move to a silghtly more closed position and the sleeve valve 137 to a slightly more open position so that under high outside temperatures a slightly lower evaporator pressure and temperature is maintained in the evaporator 52. This slight lowering of the temperature of evaporator 52 will not permit the accumulation of frost under such conditions since the air flowing from the outside over the evaporator 52 will be sufficiently warm to keep the frost from accumulating on the evaporator under such conditions. This valve therefore makes it possible to obtain the maximum capacity from the refrigerating system when the maximum capacity is most needed without the accumulation of frost on the evaporator.

While the embodiment of the present invention as herein disclosed, constitutes a preferred form, it is to be understood that other forms might be adopted.

What is claimed is as follows:

1. Refrigerating apparatus including first and second heat transfer apparatus having inlets and outlets, a compressor having an outlet connected to the inlet of the first heat transfer apparatus and having an inlet, a first flow control means for controlling refrigerant flow from the outlet of the first heat transfer apparatus to the inlet of the second heat transfer apparatus, a second flow control means for controlling refrigerant flow from the outlet of the second heat transfer means to the inlet of said compressor, means for positively and directly connecting said first and second control means for positive coordinated movement and means responsive to the pressures on both the inlet and outlet sides of said first flow control means for simultaneously and proportionately controlling said first and second flow control means.

2. Refrigerating apparatus as specified in claim 1 in which the second flow control means is a sleeve type valve means positively directly connected to the first flow control means.

3. Refrigerating apparatus as specified in claim 1 in which the second flow control means is a sleeve type valve means positively directly connected to and coaxially aligned with said first flow control means and said means responsive to pressure.

4. Refrigerating apparatus as specified in claim 1 in which the second flow control means is a sleeve type valve means having an adjustable threaded positive connection with the first flow control means.

5. Refrigerating apparatus including first and second heat transfer apparatus having inlets and outlets, a compressor having an outlet connected to the inlet of the first heat transfer apparatus, a dual valve means having two sets of inlets and oulets with a first inlet connected to the outlet of the first heat transfer and a first outlet connected to the inlet of the second heat transfer apparatus and with the second inlet connected to the outlet of the second heat transfer apparatus, said compressor having an inlet connected to the second outlet of said valve means, said dual valve means comprising a unitary pressure responsive dual valve system having a pressure responsive diaphragm means and positively and directly connected separate flow control means for each of the sets of inlets and outlets, said diaphragm means having direct positive connection with each of said flow control means for simultaneously controlling the flow of refrigerant into and out of said second heat transfer apparatus.

6. Refrigerating apparatus including first and second heat transfer apparatus having inlets and outlets, a compressor having an outlet connected to the inlet of the first heat transfer apparatus and having an inlet, a first flow control means for controlling refrigerant flow from the outlet of the first heat transfer apparatus to the inlet of the second heat transfer apparatus, a second flow control means for controlling refrigerant flow from the outlet of the second heat transfer means to the inlet of said compressor, means for positively and directly connecting said first and second control means for positive coordinated movement and means responsive to the pressures on both the inlet side of said first flow control means and one side of said second flow control means for controlling the first and second flow control means.

7. Refrigerating apparatus including first and second heat transfer apparatus having inlets and outlets, a compressor having an outlet connected to the inlet of the first heat transfer apparatus and having an inlet, a first flow control means for controlling refrigerant flow from the outlet of the first heat transfer apparatus to the inlet of the second heat transfer apparatus, a second flow control means for controlling refrigerant flow from the outlet of the second heat transfer means to the inlet of said compressor, means for positively and directly connecting said first and second control means for positive coordinated movement and means responsive in major proportion to the pressure upon one side of said second flow control means and in minor proportion to the pressure on the inlet side of said first flow control means for controlling said first and second flow control means.

8. Refrigerating apparatus including first and second heat transfer apparatus having inlets and outlets, a compressor having an outlet connected to the inlet of the first heat transfer apparatus and having an inlet, a first flow control means for controlling refrigerant flow from the outlet of the first heat transfer apparatus to the inlet of the second heat transfer apparatus, a second flow control means for controlling refrigerant flow from the outlet of the second heat transfer means to the inlet of said compressor, means for positively and directly connecting said first and second control means for positive coordinated movement and means responsive in major proportion to the pressure upon the inlet side of said second flow control means and in minor proportion to the pressure on the inlet side of said first flow control means for controlling said first and second flow control means.

References Cited by the Examiner
UNITED STATES PATENTS
2,116,801   5/1938   Shivers _____ 62—255 X MEYER PERLIN, *Primary Examiner.*